(12) United States Patent
Henriksen et al.

(10) Patent No.: US 8,883,019 B2
(45) Date of Patent: Nov. 11, 2014

(54) METHOD FOR MANUFACTURING ADJUSTABLE LENS

(75) Inventors: Lars Henriksen, Tønsberg (NO); Morten Eliassen, Sandefjord (NO); Vladimir Kartashov, Horten (NO); Jon Herman Ulvensøen, Åsgårdstrand (NO); Ib-Rune Johansen, Oslo (NO); Karl Henrik Haugholt, Oslo (NO); Dag Torstein Wang, Oslo (NO); Frode Tyholdt, Oslo (NO); Wilfred Booij, Nordby (NO)

(73) Assignee: Polight AS, Horten (NO)

( * ) Notice: Subject to any disclaimer, the term of this patent is extended or adjusted under 35 U.S.C. 154(b) by 1104 days.

(21) Appl. No.: 12/445,274

(22) PCT Filed: Oct. 5, 2007

(86) PCT No.: PCT/NO2007/000351
§ 371 (c)(1), (2), (4) Date: Jan. 12, 2010

(87) PCT Pub. No.: WO2008/044938
PCT Pub. Date: Apr. 17, 2008

(65) Prior Publication Data
US 2010/0133230 A1    Jun. 3, 2010

(30) Foreign Application Priority Data

Oct. 11, 2006 (NO) .................................. 20064624
Nov. 14, 2006 (NO) .................................. 20065238

(51) Int. Cl.
| | | |
|---|---|---|
| B22C 1/22 | (2006.01) | |
| B29D 11/00 | (2006.01) | |
| H04N 5/225 | (2006.01) | |
| G02B 26/08 | (2006.01) | |
| G02B 3/14 | (2006.01) | |
| G02B 13/00 | (2006.01) | |

(52) U.S. Cl.
CPC .......... *G02B 26/0875* (2013.01); *H04N 5/2254* (2013.01); *G02B 13/001* (2013.01); *G02B 3/14* (2013.01)
USPC ............................................. 216/26; 264/1.7

(58) Field of Classification Search
CPC ..... G02B 3/14; G02B 26/0875; G02B 13/001
USPC ............................................. 216/26; 264/1.7
See application file for complete search history.

(56) References Cited

U.S. PATENT DOCUMENTS

| | | |
|---|---|---|
| 5,886,332 A | 3/1999 | Plesko |
| 6,188,526 B1 | 2/2001 | Sasaya et al. |

(Continued)

FOREIGN PATENT DOCUMENTS

| | | |
|---|---|---|
| CN | 2706779 | 6/2005 |
| DE | 3644225 | 7/1987 |

(Continued)

OTHER PUBLICATIONS

Chinese Office Action, dated Mar. 18, 2010 from CN Appl. 200780034604.6 filed Sep. 21, 2007.

(Continued)

*Primary Examiner* — Duy Deo
*Assistant Examiner* — Mahmoud Dahimene
(74) *Attorney, Agent, or Firm* — Knobbe Martens Olson & Bear LLP

(57) ABSTRACT

The present invention provides method steps for manufacturing an assembly of adjustable lenses on a wafer. The method steps provide an easy manufacturing of such lenses, minimizing the cost of assembly, and at the same time provide a solution for mass production of compact adjustable lenses for use in mobile phones, etc.

16 Claims, 4 Drawing Sheets

(56) References Cited

U.S. PATENT DOCUMENTS

| | | |
|---|---|---|
| 2002/0048096 A1 | 4/2002 | Melzer et al. |
| 2002/0149864 A1 | 10/2002 | Kaneko |
| 2004/0008419 A1 | 1/2004 | Schachar |
| 2005/0036195 A1 | 2/2005 | Nishioka |
| 2005/0133789 A1 | 6/2005 | Oh et al. |
| 2006/0028734 A1 | 2/2006 | Kuiper et al. |
| 2006/0133789 A1 | 6/2006 | Yu |
| 2006/0139585 A1 | 6/2006 | Maria Van Der Vijst et al. |
| 2007/0070476 A1 * | 3/2007 | Yamada et al. .......... 359/9 |
| 2007/0211349 A1 | 9/2007 | Chen |
| 2007/0263293 A1 | 11/2007 | Batchko et al. |
| 2007/0299487 A1 | 12/2007 | Shadduck |
| 2008/0277480 A1 | 11/2008 | Thurles |
| 2010/0091389 A1 | 4/2010 | Henriksen et al. |
| 2011/0096411 A1 | 4/2011 | Henriksen et al. |
| 2011/0149408 A1 | 6/2011 | Hahgholt et al. |
| 2011/0149409 A1 | 6/2011 | Haugholt et al. |
| 2011/0164330 A1 | 7/2011 | Henriksen et al. |

FOREIGN PATENT DOCUMENTS

| | | |
|---|---|---|
| GB | 2163864 | 3/1986 |
| JP | 62151824 | 7/1987 |
| JP | 01140118 A | 6/1989 |
| JP | 02178602 A | 7/1990 |
| JP | 1062609 | 3/1998 |
| JP | 10-269599 | 10/1998 |
| JP | 11133210 A | 5/1999 |
| JP | 200081503 | 3/2000 |
| JP | 2000249813 A | 9/2000 |
| JP | 2001257932 | 9/2001 |
| JP | 2002243918 | 8/2002 |
| JP | 2002-311213 | 10/2002 |
| JP | 2002239769 | 8/2008 |
| NO | 20064271 | 9/2006 |
| WO | WO 2004/038480 | 5/2004 |
| WO | WO 2004059364 | 7/2004 |
| WO | WO 2005085930 | 9/2005 |
| WO | WO 2006/088514 A2 | 8/2006 |
| WO | WO 2006/109638 A1 | 10/2006 |
| WO | WO 2007017089 | 2/2007 |
| WO | WO 2008035983 | 3/2008 |
| WO | WO 2008035984 | 3/2008 |
| WO | WO 2008/044937 | 4/2008 |
| WO | WO 2008/100154 | 8/2008 |
| WO | WO 2010/005315 | 1/2010 |

OTHER PUBLICATIONS

Extended EP Search Report for EP Application 07834764.8; issued Nov. 23, 2011.

* cited by examiner

METHOD FOR MANUFACTURING ADJUSTABLE LENS

CROSS REFERENCE TO RELATED APPLICATIONS

This application claims the benefit and priority to and is a U.S. National Phase of PCT International Application Number PCT/NO2007/000351, filed on Oct. 5, 2007. This application claims the benefit and priority to Norwegian Application No. NO 20064624, filed on Oct. 11, 2006 and Norwegian Application No.: NO 20065238, filed on Nov. 14, 2006. The disclosures of the above-referenced applications are hereby expressly incorporated by reference in their entirety.

The present invention is related to a method for manufacturing adjustable lenses, and especially to a method for manufacturing adjustable lenses on wafer technology.

There is an increasing demand for low cost, high volume solutions for adjustable lens elements in an ever increasing number of applications. The popular use of cameras in mobile phones represents an amount of millions of lenses. The design of such lenses requires fulfillment of a plurality of requirements, such as ease of operation when fitting the lens on top of a camera module in the mobile phone, providing as few operational steps as possible, etc. These challenges are even greater when the lens arrangement comprises tunable parameters, such as encountered in auto focus lenses, wherein the focal length must be adjusted to fit the distance from the lens to the object to be photographed, for example. Such lenses are usually complex designs comprising movable parts, for example, which can make it difficult to assemble in a reasonable manner. A further challenge with such designs are the ever increasing requirement to provide as thin lens assemblies as possible. Thin and lightweight mobile phones and cameras is a must in the marketplace.

In prior art there are some examples of lens designs providing simplified variable focal length lens assemblies. For example, JP 02-178602 disclose a lens assembly wherein a couple of transparent base materials with a liquid in between provides a bending of the base materials by applying a voltage on piezo electric elements disposed on one of the base materials, wherein the bending provides a desired, curvature of the surfaces of the lens assembly.

JP 2000-249813 disclose a lens assembly comprising a deformable transparent material disposed in between two bendable transparent plates. A common actuator can bend the plates to provide a shift of the focal length of the lens assembly.

JP 01-140118 disclose an adjustable lens assembly comprising a piezo electric polymer with transparent electrodes on top of a cylinder container comprising a transparent liquid. Voltages applied onto the piezo electric polymer provides a curvature of the polymer, and hence a shift of focal length.

The inventors of the present invention has also invented a design of an adjustable lens assembly as depicted in FIG. 1. It is an aspect of the present invention to provide a method for manufacturing lens assemblies as depicted in FIG. 1.

According to an aspect of the present invention, a method for manufacturing a lens assembly comprising following constructional elements and constructional relationships, including all listed elements or any subset of elements, with or without other elements not disclosed, in the listed order of elements, or in any order of elements, at least one support supporting a gel or elastomer comprising a thin glass cover, wherein a circular shaped middle part of the thin glass cover is arranged as an island with no contact to the rest of the glass cover, floating on top of the gel, wherein a thin circular piezoelectric ring shaped crystal is disposed along the edge of the glass island, the rest of the glass cover is disposed on top of the gel until the edges of the at least one support, wherein distal elements along the edge of the at least one support provides electric connections for signals applied on the piezoelectric ring, and wherein the distal elements at the same time provides mechanical support and fixation of the glass cover to the at least one support, can be mass produced.

The present invention is related to examples of methods for producing adjustable lenses in which a flexible, transparent material is sandwiched between two glass plates, in which one or both of the glass plates are shaped by the means of an actuator (for example a piezoelectric actuator). The flexible material is included in order to provide the bulk material of the lens, and could be for example provided for by polymer gels, elastomers, or linear or branched polymeric or oligomeric oils.

According to an example of embodiment of the present invention, processes for the production of adjustable lenses is provided for on wafer scale.

According to an aspect of the present invention, implementation of the wafer scale adjustable lenses with a stack of other fixed or adjustable lenses is possible.

Yet another aspect of the present invention is to facilitate the implementation of adjustable lenses with other optical systems on a wafer scale assembly, such as optical sensors (for the facilitation of wafer scale camera modules, for example).

Another aspect of the present invention is to include features like electrical contact for the actuator in a compact manner.

There exists a number of technologically feasible solutions for making compact adjustable lenses, for use in applications such as (auto)focus lenses or zoom lenses. The present invention is related to manufacturing processes for adjustable lenses that comprises a flexible material (often a polymer gel, an elastomer or an oil) sandwiched between two more rigid materials (for example glass or harder polymer materials). One or both of these rigid materials are connected to an actuator. The actuator provides a force that distorts the shape of the rigid cover material. The distortion causes a slight shaping of the flexible material, giving a lens shape. The lens shaping will then change the focusing of light going through the lens. The adjustable lens can be used for example in auto focus or zoom lens applications.

Figure 1:
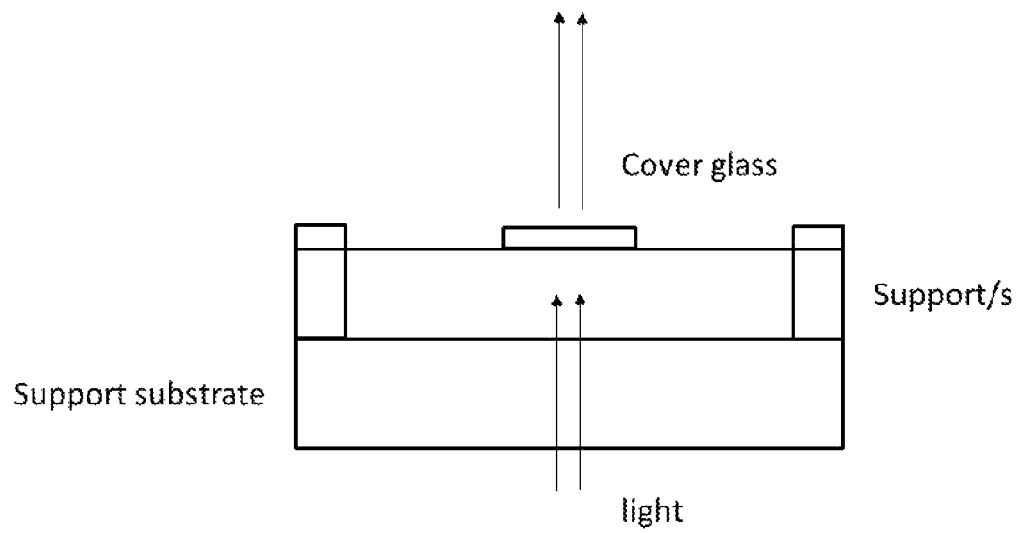
FIG. 1 illustrates a design of an adjustable lens assembly.
Figure 1:
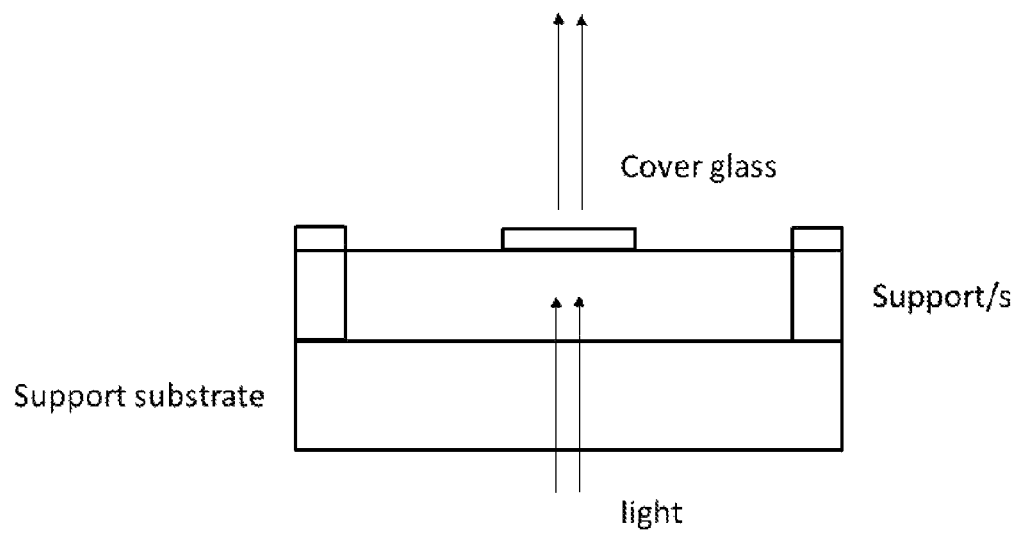
Figure 2:
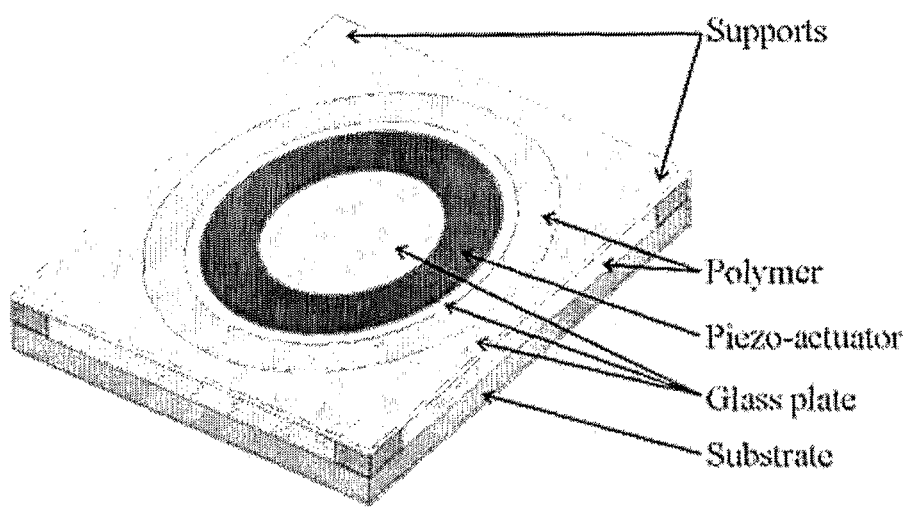
FIG. 2 illustrates a perspective view of the design depicted in FIG. 1.

The present invention relates to processes for the manufacturing of lens assemblies that comprise (viewed from bottom and upwards) a support glass, spacer materials, a flexible material (a polymer), a cover glass with actuator (for example piezoelectric actuator) disk that "floats" on the flexible material. See FIGS. 1 and 2 for a schematic illustration.

Important aspects of the related lens assembly are the geometrical sizes, both of individual structures that the lens is built up from, and the total physical size of the lens element. In the above described lens design, the thickness of the flexible material and of the shapeable cover material are significant to the functionality of the tunable lens element. In order to use as low as possible actuating force (and thereby voltages applied for example a piezo crystal), it is preferable to keep the cover material thickness to aperture ratio as low as possible. The actual optimal thickness will be a trade off between ease of handling, quality of lens surface curvature and low actuating forces. Examples of geometrical dimensions for a lens element with for example 1 mm aperture may be a cover glass thickness of 5-50 µm and polymer thickness of 0.1 to 2 mm. The thickness of the support glass is not critical for the functioning of the lens assembly. However, mechanical stability is a design parameter. In an example of embodiment of the lens assembly the thickness is about 200 µm or more.

Since the adjustable lens includes an actuator, electrical signals must in be brought from a voltage supply/control unit onto the actuator element or elements, if the actuator comprises a plurality of individual actuator elements. This can be achieved by providing electrodes on the outside of each lens element after singulation, or electrodes can be integrated into each individual lens element. The latter is preferred, and could be inevitable if wafer scale integration of the adjustable lens element with other lens systems and/or image sensors is to be accomplished.

In an example of embodiment of the lens assembly, driving electronics and/or control electronics for the actuator is provided on a part of the supporting substrate. In this example of embodiment, signals may be provided by conducting elements related to the spacer elements bringing signals from the support and the electronics integrated into the support on to the cover glass providing a possibility to contacting the actuator element or actuator element comprised the glass island via bonding.

Electrodes from the actuator on the floating island disk could be directed to the edges of the lens element by for example integrating them on the cover glass, creating electrode bridges to the shapeable disk island, or they could be prepared in a separate step sometime after the etching of the cover glass/actuator.

Several examples of embodiments of the present invention can be described. Below there is some examples of embodiments that is not to be vied as limiting the scope of the present invention, but are only examples of embodiments. Any order of steps may be interchanged or combined with other steps.

EMBODIMENT A

An example of embodiment of the present invention comprise the following steps:
1. Spacer elements (for example glass beads, polymer beads, fibers, Solid elements made from metals (gold, silicon etc)) are prepared onto the support substrate/glass by one of several possible techniques (gluing, lift-off, deposition, selective etching, growing etc.)
2. A liquid pre-polymer is spin coated, sprayed, dispensed or similar onto the support glass with spacers.
3. A continuous cover glass with pre-assembled actuators is then flip-chip assembled onto the support glass/spacer/polymer substrate, and bonded using one of several possible known bonding techniques (anodic, gluing etc.)
4. The cover glass with actuators is masked and selectively etched, in order to form the "floating" active disk of the adjustable lens
5. electrical contacts for the actuator is formed
6. In the case of creating multiple lens elements on a wafer, the individual elements are finally formed by sawing the whole wafer in a grid pattern such that parts of the spacer elements are left in the corner of the grid pattern after the sawing.

Regarding step 3 and 4 above, an optional scheme to accomplish the effect of step 3 and 4, is by manufacturing the cover glass comprising a plurality of holes equivalent to the holes provided by the etching, and correspondingly providing pre manufactured glass disks comprising actuator elements, and then positioning the glass islands in the opening of the holes floating on top of the polymer.

The advantages of this example of embodiment are: 1) the facilitation of easily available wafer scale processing steps, 2) a compact adjustable lens can be formed (the width of the lens element can be as small as 2-3 times the aperture diameter, 3) the lens element has good mechanical stability due to the presence of the fixed spacer elements.

Example of Choice of Materials

The following is an example of materials and processes that could be chosen according to the example of method as outlined in the example A.

According to an example of embodiment of the present invention, polycrystalline silicon is deposited onto a 300 µm thick support glass wafer. The polysilicon is polished down to the desired spacer thickness (for example 500 µm). A resist polymer is spin coated onto the polysilicon, and selectively UV-cured through a mask. Surplus resist is washed off, and the silicon is removed by for example dry etch techniques, in order to create the spacer elements. After deposition and curing of the flexible polymer, the cover glass with piezo actuators is assembled onto the spacer elements, and bonded or glued together. The final step before singulation is the etching of the cover glass, that creates the shapeable disks floating atop the flexible polymer film.

EMBODIMENT B

Another example of embodiment of the present invention comprises steps as illustrated in method A, but comprise a step delaying the application of the polymer material to a moment after the cover glass has been mounted onto the support/spacer substrate. An advantage of the embodiment B is that the limited process temperatures that are associated with organic or inorganic polymers can be omitted by delaying the introduction of these materials into the lens element. Another advantage is that contamination of bonding surfaces by polymer is avoided, and the bonding step of the process can be greatly simplified.

EMBODIMENT C

Another example of embodiment of the present invention comprises steps as illustrated in the examples A and B above, but forming the spacer elements on the cover glass substrate with actuator. The spacer elements should have some arrangement that is continuous or semi-continuous, in order to provide mechanical stability to the very thin cover glass. One elegant way of accomplishing this is to prepare the actuating piezo crystals onto a thin glass film bonded on a silicon wafer. Either before or after piezo deposition, the silicon on the back-side is masked according to a desired pattern, and etched by one of known techniques to form the spacer elements. This actuator/cover glass with spacer elements is then bonded to the support glass, and at any point in time the polymer material is introduced, as described in the examples A and B above.

EMBODIMENT D

Another example of embodiment of the present invention comprise method steps as illustrated in the examples A and B above, but comprise further spacer materials that are any conductive material. The actuator that creates the force on the top cover glass has to be connected to an external voltage supply and control system by electrodes. By combining spacer materials that are conductive (for example metals, silicon, conductive polymers, glues or composite materials) with through holes in the cover glass and either through holes or electrodes on the support glass, an extremely compact adjustable lens is provided.

When the actuator is arranged as a plurality of individual actuator elements, the spacer elements comprise a plurality of conductors, and a plurality of contacting pads on top of the continuous cover glass through via holes.

EMBODIMENT E

Figure 3:
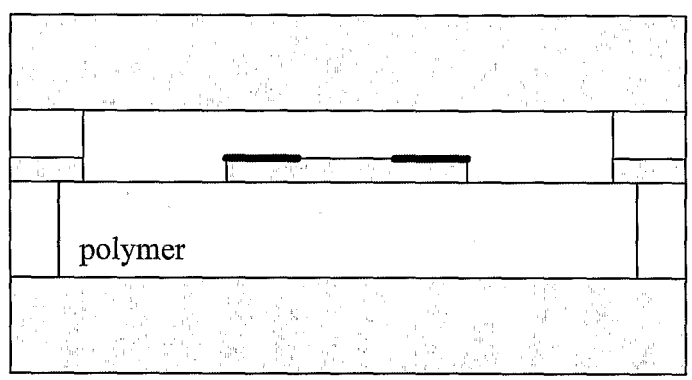
FIG. 3 depicts another example of adjustable lens.
Figure 4:
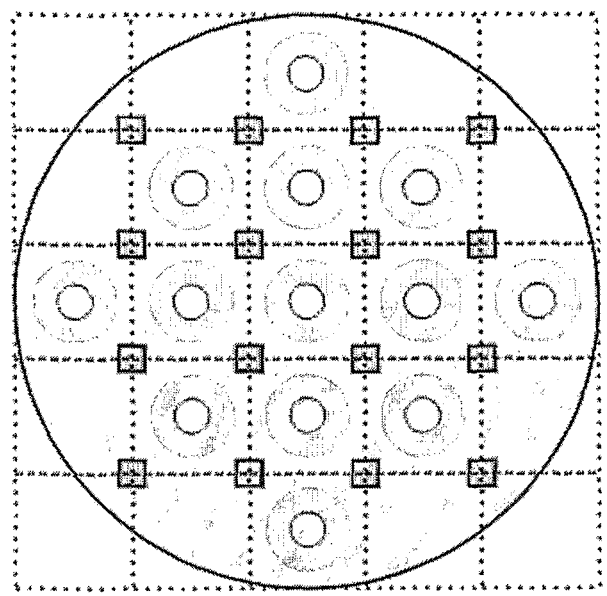
FIG. 4 illustrates an array of lens assemblies on a wafer.
Figure 5:
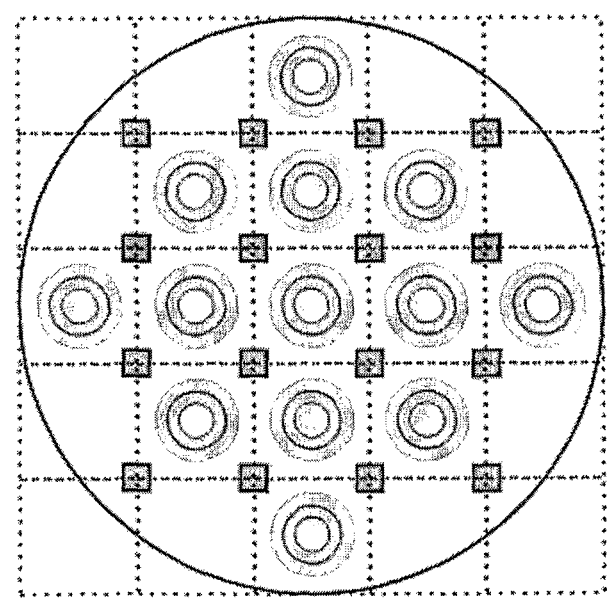
FIG. 5 illustrates another array of lens assemblies on a wafer.

Another example of embodiment of the present invention comprise method steps as illustrated in the examples A, B or C, comprising further disposing an integrated protective cover glass, as shown schematically in FIG. 3.

EMBODIMENT F

Another example of embodiment comprise method steps wherein the polymer is formed such that the polymer do not cover the whole assembly, but instead the polymer is provided as individual elements for each lens element in the process. The polymer material can be manufactured in any prior art processes, such as printing, deposition, dispensing, spin coating or similar. In addition, the polymer elements can either be applied onto the cover glass containing the actuator elements or onto the support substrate.

EMBODIMENT G

Figure 6:
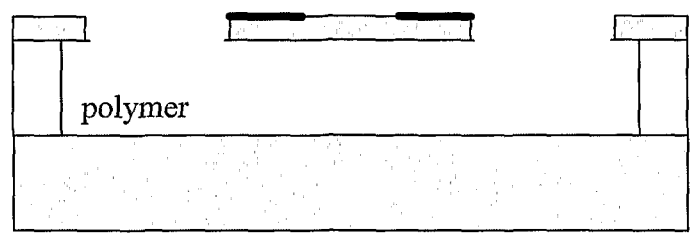
FIG. 6 illustrates a lens assembly with partially removed polymer.

Another example of embodiment of the present invention comprise method steps where the polymer layer is partially removed, by for example by partial etching of the polymer before or after assembly of the cover glass element, creating a lens element structure as depicted in FIG. 6. The advantages of this example of method according to the present invention is that the deformation of the actuator element can be eased, providing lower requirements for the drive voltages.

EMBODIMENT H

Another example of embodiment of the present invention comprise steps as illustrated in D, but comprise further method steps providing the spacer material as a continuous wall. This facilitates the creation of a hermetically sealed compartment comprising the actuator element and the flexible material. This example of embodiment expands the range of applicable materials for the flexible element, as the flexible material can include gels or highly viscous polymers that contain liquids with a certain volatility.

EMBODIMENT I

Figure 7:
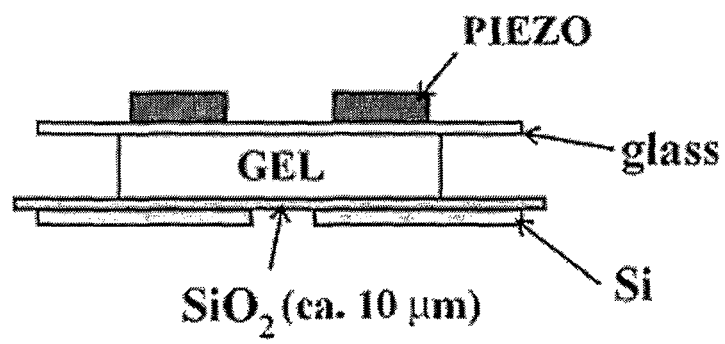
FIG. 7 illustrates another example of lens assembly.

Yet another example of embodiment of the present invention comprise method steps wherein the support glass is replaced by a glass-on-silicon substrate, where an opening in the silicon is provided, wherein the light path is located. FIG. 7 is a schematic illustration. The advantage of this embodiment is the facilitation of available processes for creating through holes for electrical contacting, while maintaining good mechanical stability of the support glass although the thickness of the glass itself is low.

In this example of embodiment of the present invention, driving electronics and control logic for activating and controlling the actuators may be provides as an integrated circuit deposited on to the silicon part of the substrate, or being an integral part of the silicon material, as known to a person skilled in the art.

The invention claimed is:
1. A method of manufacturing an adjustable lens assembly, wherein the method comprises:
forming onto a transparent support a plurality of spacer members in a predefined grid pattern;
adding a polymer on to the transparent support comprising the spacer members;
attaching a glass cover on the polymer, wherein the glass cover comprises one or more piezo electric actuators;
masking a circular shaped portion of the glass cover, wherein the masked portion encloses the piezo electric actuators;
etching an annular hole in the glass cover, wherein the circular shaped portion of the glass cover remains and is disconnected from other portions of the glass cover, and wherein the piezo electric actuators are on the perimeter of the circular shaped portion; and
forming electrical contacts for the piezo electric actuators.
2. The method according to claim 1, wherein the adjustable lens assembly is one adjustable lens assembly of a plurality of similar adjustable lens assemblies manufactured on a wafer, and the method further comprises sawing the wafer providing individual adjustable lens assemblies by sawing the whole wafer along directions provided by the grid pattern, wherein the spacer members are divided by the sawing such that parts of each spacer member is left respectively in each exemplar of lens assembly after singulation.
3. The method according to claim 1, wherein the adjustable lens assembly is one adjustable lens assembly of a plurality of similar adjustable lens assemblies manufactured on a wafer, wherein the glass cover is arranged across all of the lens assemblies, wherein a circular opening is formed in the glass cover over each lens assembly to be manufactured, and wherein a circular glass cover portion enclosing piezo electric actuators is formed on top of the polymer of each of the plurality of openings in the glass cover.
4. The method according to claim 1, wherein the spacer members are formed by first bonding the glass cover to a silicon substrate, and then applying a mask on the silicon substrate defining the form of the spacer elements, and then etching the silicon substrate to provide the spacer members out of the silicon substrate.
5. The method according to claim 4, wherein the piezo electric actuators are formed on the glass cover bonded to the silicon substrate before the silicon substrate is etched to form the spacer members.
6. The method according to claim 1, wherein the spacer members are arranged with electrically conducting materials and via holes in the glass cover, thereby providing contacting pads for electrodes attached to the piezo electric actuators.
7. The method according to claim 6, wherein the spacer members comprise a plurality individual conductors, and the piezo electric actuators comprise a plurality of actuator elements.
8. The method according to claim 1, wherein the lens assembly is arranged with an additional protective glass cover.
9. The method according to claim 1, wherein the polymer is added as a deposition of polymer in the center of each respective lens assembly on a wafer.

10. The method according to claim 2, wherein the polymer is added as a deposition of polymer on the glass cover at the center of the corresponding position of each respective lens assembly on the transparent support.

11. The method according to claim 1, wherein the addition of the polymer is done by either printing, or deposition, or dispensing, pr spin coating, or a similar technique.

12. The method according to claim 1, wherein the polymer is partly removed after deposition.

13. The method according to claim 1, wherein the spacer members are arranged as a continuous wall around the perimeter of each of a plurality of lens assemblies.

14. The method according to claim 1, wherein the transparent support is provided for by a glass on silicon substrate, wherein an opening is provided for in the silicon letting light pass through the lens assembly.

15. The method according to claim 14, wherein the silicon part of the transparent support comprises a plurality of electronic circuits driving and controlling the respective piezo electric actuators of each lens assembly.

16. A method of manufacturing an adjustable lens assembly, wherein the method comprises:

forming onto a transparent support a plurality of spacer members in a predefined grid pattern;

attaching a glass cover to the spacer members, wherein the glass cover includes a polymer on the support side of the glass cover, and wherein the glass cover comprises one or more piezo electric actuators;

masking a circular shaped portion of the glass cover, wherein the masked portion encloses the piezo electric actuators;

etching an annular hole in the glass cover, wherein the circular shaped portion of the glass cover remains and is disconnected from other portions of the glass cover, and wherein the piezo electric actuators are on the perimeter of the circular shaped portion; and forming electrical contacts for the piezo electric actuators.

* * * * *